No. 685,145.    
H. JOHN.    
Patented Oct. 22, 1901.
TRANSMISSION OR COUPLING DEVICE FOR POWER ENGINES OR MACHINES.
(Application filed Sept. 8, 1900.)
(No Model.)
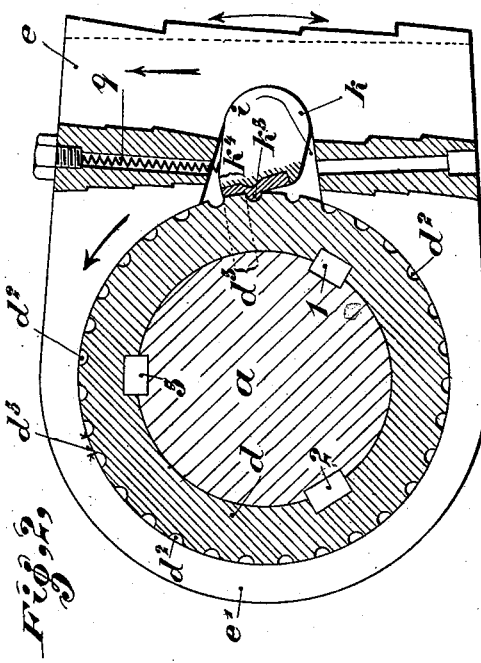
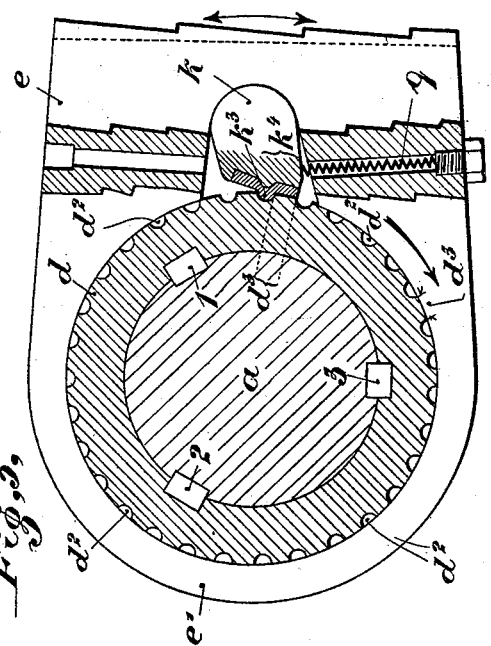
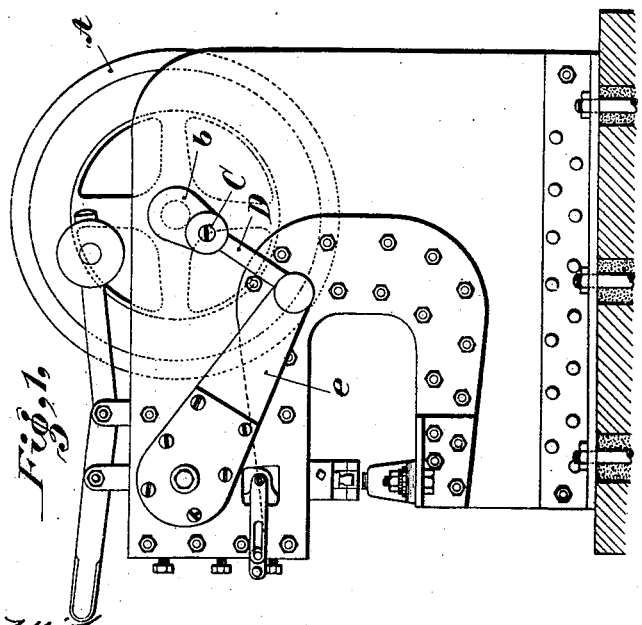
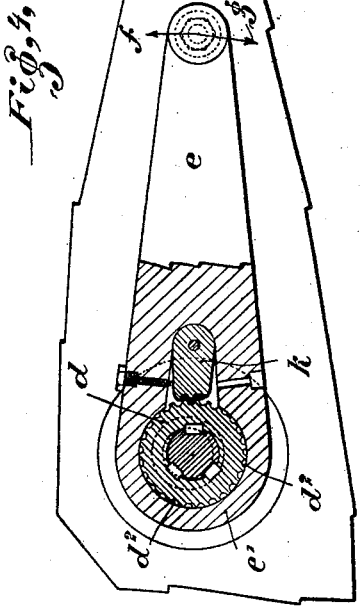
Witnesses
Dennis Sumby.
C. D. Kesler.
Inventor
Hugo John
By James L. Norris
Atty

UNITED STATES PATENT OFFICE.

HUGO JOHN, OF ERFURT, GERMANY.

TRANSMISSION OR COUPLING DEVICE FOR POWER ENGINES OR MACHINES.

SPECIFICATION forming part of Letters Patent No. 685,145, dated October 22, 1901.

Application filed September 8, 1900. Serial No. 29,440. (No model.)

*To all whom it may concern:*

Be it known that I, HUGO JOHN, manufacturer, a subject of the King of Prussia, residing at Erfurt, in the Kingdom of Prussia and German Empire, have invented certain new and useful Improvements in Transmission or Coupling Devices for Power Engines or Machines, of which the following is a specification.

This invention relates to a coupling or transmission device for coupling the driving parts of power machines or engines to the driven parts—for instance, machines intended for cutting, dividing, pressing, or transforming metal, machines for mixing or crushing, for draw-presses, welding-presses, and the like where great power is to be exerted—and relates particularly to means by which a comparatively slow rotary or intermittent movement is given by a rapidly-rotating main or driving shaft. The coupling is effected by means of a toothed ring mounted upon the operating-shaft of the machine and surrounded by the eye of a one-arm lever, the latter carrying a wedging or pressure device which presses almost radially against the toothed ring as the lever oscillates in such a manner that the effective component force of the pressure or wedging device causes one-half of the eye of the lever to exercise a great pressure against the operating-shaft, in consequence of which and the action of the wedging or pressure device thus caused by the oscillating lever the said operating-shaft is forced to participate in the movement of the lever in one or the other direction.

In the drawings, where like characters of reference indicate corresponding parts throughout the several views, Figure 1 is an elevation of an ordinary punching-machine, showing the manner in which my improved coupling device is attached thereto. Figs. 2 and 3 are enlarged elevations of one end of the oscillating lever. Fig. 4 is a sectional elevation of the oscillating lever.

I have shown in Fig. 1 a punching-machine of any ordinary kind, which is provided with a fly-wheel A, on the shaft of which is keyed a crank $b$. The pin C of the crank $b$ is attached to a connecting-rod D. The punching-machine is shown simply to illustrate the manner in which my improved coupling or transmission device is connected thereto and to also show the means for operating the coupling or transmission device.

To the connecting-rod D is connected the oscillating lever $e$ of my improved coupling or transmission device and which has its opposite end formed with an eye to permit of the mounting thereof upon the toothed ring $d$, adjustably secured upon the operating-shaft $a$. The operating-shaft $a$ is intermittently rotated by means of the pressure device $k$ engaging with the teeth $d^2$ and pressing radially against the ring $d$—that is to say, the pressure component of the said pressure device passes through the axis of rotation of the ring $d$, in consequence of which considerable radial pressure is produced, the pressure device $k$ drawing, as it were, the eye $e'$ of the lever toward the ring $d$, whereby the ring $d$, and with it the operating-shaft $a$, is induced by friction to follow the lever $e$. The ring $d$ is keyed on the shaft by means of wedges or tenons 1 2 3 engaging in corresponding recesses both in the shaft $a$ and the ring $d$. By removing the keys 1 2 3 and turning the ring through one-third of the circumference and keying it again a new field of contact is rendered available instead of the old one, which may have become worn.

With a view of rendering more advantageous the conditions resulting from the contact-surfaces between the shaft $a$ and the eye $e'$ of the lever the pressure device may be provided with an outer contact-surface $k^4$, concentrically formed with the periphery of the shaft or ring $d$, so that when in action the whole surface is in contact with the corresponding part of the periphery of the shaft or ring.

The annular ring is provided with grooves $d^2$, of semicircular cross-section, parallel with the axis of the shaft, while the pressure device $k$ is provided with a projection $k^3$, corresponding with the said grooves. It is clear that when the pressure device $k$ is in effective contact with the ring $d$ its surface $k^4$ also presses against the corresponding part $d^3$ of the ring. Since in such an arrangement the pressure device $k$ is placed with its circular portion against the periphery of the ring, it is always concentrically arranged, as regards this surface, with the driven shaft, and it will act in one or the other directions when oscillating with the lever, according to the way in which it is set in the recess $i$ of the said lever. If, therefore, from any reason whatever the tool actuated by the driven shaft can no longer move forward or is intended no longer to move forward, it will suffice to take out the pressure device and to change its position from that represented in Fig. 4 to that represented in Fig. 5, or vice versa, and change the position of the spring $a$, so as to obtain a reverse movement of the coupling device.

It may be observed that when the oscillating lever causes the pressure device $k$ to engage the toothed surfaces of the ring $d$ it produces such an amount of friction between the back surface of the lever-eye $e'$ and the adjoining surface of the ring $d$ that the operating-shaft $a$, being connected with the ring, partakes also of the movement. Since the oscillations of the lever $e$ are small, the shaft $a$ is turned only a small amount. Thus it will be seen that the fly-wheel shaft may be made to rotate at a very great rate (as many as three hundred and fifty revolutions) while the operating-shaft is turning slowly. Thus it may be said by such an oscillating lever power and motion transmission is converted into slow motion.

Having thus described my invention, what I claim as new, and desire to secure by Letters Patent, is—

1. In a power transmission or coupling device, the combination of the operating-shaft of the machine, of an adjustable grooved ring mounted upon said shaft, an oscillating lever pivotally mounted at one end upon the said ring and provided with a pair of sockets, a pressure device mounted in said lever between the said sockets and adapted to engage said ring, causing thereby the rotation of said operating-shaft, a spring mounted in one of said sockets and adapted to engage said pressure device, and a link connected to the free end of said lever and to an operating means for causing the oscillation of the lever.

2. In a power transmission or coupling device, the combination with an operating-shaft of the machine, of a grooved ring mounted upon said shaft, keys for adjustably connecting said ring to said shaft, an oscillating lever provided with an eye to permit of the pivoting thereof upon the said ring, said lever further provided with a pair of sockets, a pressure device mounted in said lever and engaging said ring for causing the operation of said shaft, a spring mounted in one of the sockets and engaging the pressure device for retaining the same normally in contact with said ring, and means connected to the free end of the said lever and an operating means for causing the oscillation of the lever.

3. In a power transmission or coupling device, a grooved ring adjustably connected to the operating-shaft of the machine, an oscillating lever pivoted at one end upon said ring, a pressure device mounted in said lever and provided with a projection for engaging in the grooves of the ring and further provided with a flat surface engaging the periphery of the ring, said pressure device adapted when in engagement with said ring, to operate the said shaft, and means connected to the free end of said lever for oscillating the same.

In testimony whereof I have hereunto set my hand in presence of two subscribing witnesses.

HUGO JOHN.

Witnesses:
MAX MEYER,
CARL KIND.